United States Patent [19]

Shaikh

[11] Patent Number: 4,538,200
[45] Date of Patent: Aug. 27, 1985

[54] POWER CONNECTION APPARATUS HAVING INTEGRATED SURGE ARRESTOR

[75] Inventor: Maqboolhusein G. Shaikh, Troy, Ohio

[73] Assignee: A. O. Smith Corp., Milwaukee, Wis.

[21] Appl. No.: 476,115

[22] Filed: Mar. 17, 1983

[51] Int. Cl.³ .............................................. H02H 3/22
[52] U.S. Cl. ..................................... 361/117; 361/91; 310/68 R
[58] Field of Search ................. 361/118, 117, 123, 91; 310/68 R

[56] References Cited

U.S. PATENT DOCUMENTS

| | | | |
|---|---|---|---|
| 2,670,452 | 2/1954 | Yonkers et al. | 361/117 |
| 2,959,692 | 11/1960 | Marx | 361/91 |
| 3,435,290 | 3/1969 | Lyman | 361/118 |

Primary Examiner—A. D. Pellinen
Assistant Examiner—Hong K. Choe
Attorney, Agent, or Firm—Andrus, Sceales, Starke & Sawall

[57] ABSTRACT

A power cable for a submersible motor has a releasable plug-in connector for releasable attachment to the motor. An oil-filled motor has solid conductors to the motor connector part and the flexible conductors to the cable connector part. The cable connector part has a plurality of lead terminals located in a common plane and a plastic molded shell which is flat and rectangular. A shell flange is bolted to the motor. An integrated voltage surge arrestor is located in an opening in the shell which exposes the terminals, and includes a thin arrestor block of silicon carbide or metal oxide varistor secured to a mounting plate which seals the opening. The silicon carbide block is a porous fragile unit supported by the plate and connected to ground by the well liquid, or by a connection to the clamp bolts. The two outer terminals are connected to the 230 voltage lines and the opening is formed with intermediate line insulation separating the chambers of such outer terminals. The arrestor assembly is similarly formed in either a two-wire or a three-wire submersible motor cable. The surge arrestor may be located within a motor and in other cable configurations.

13 Claims, 9 Drawing Figures

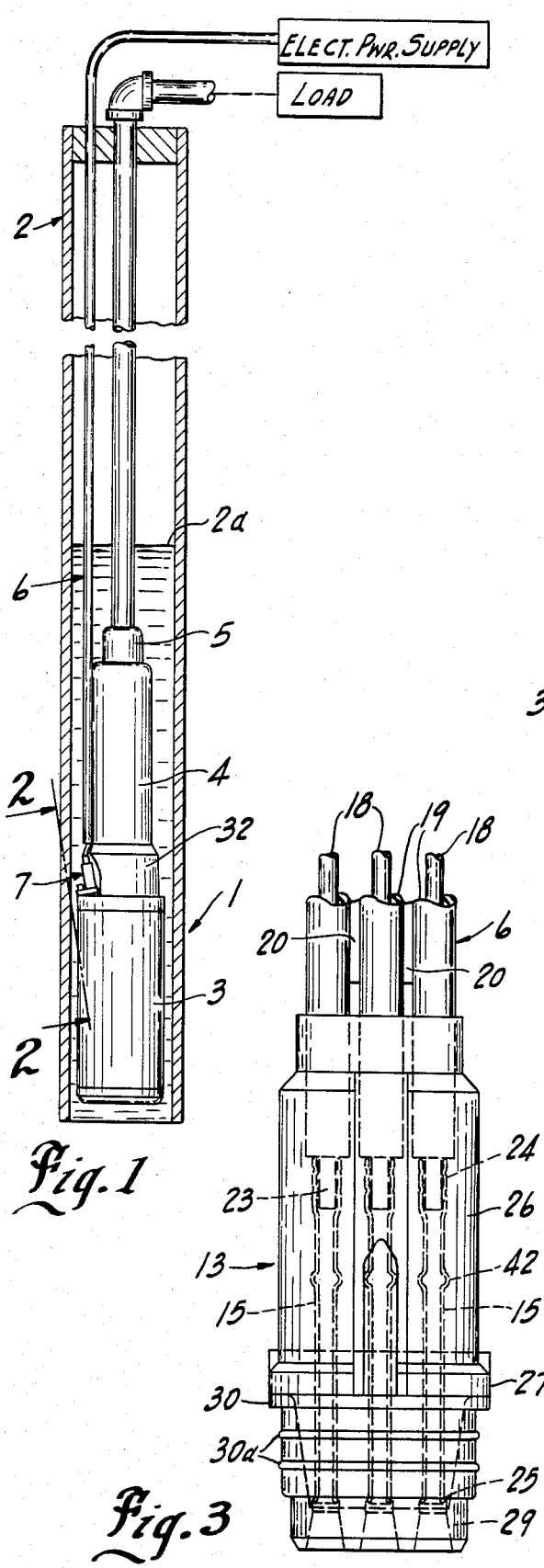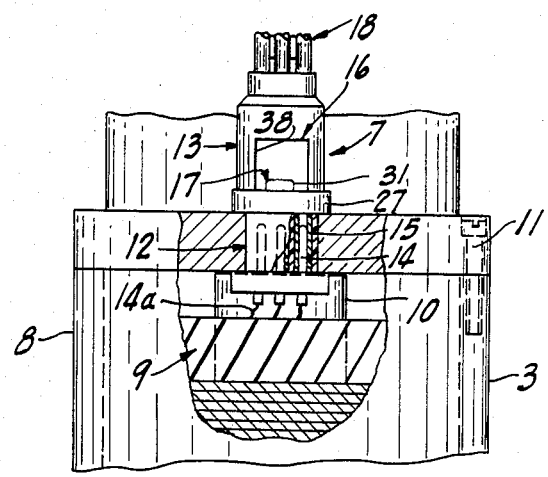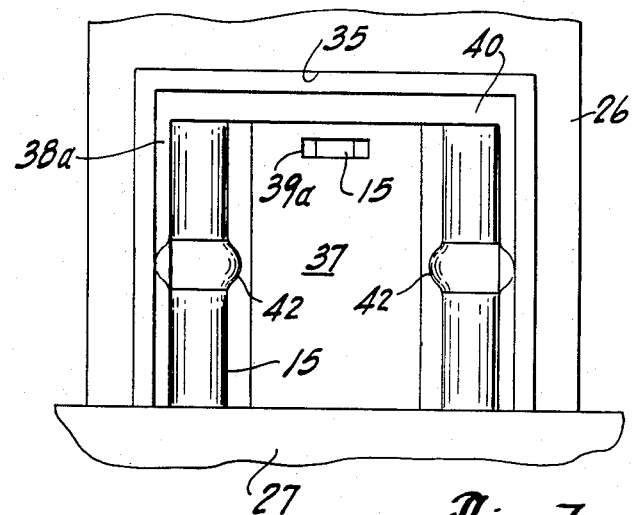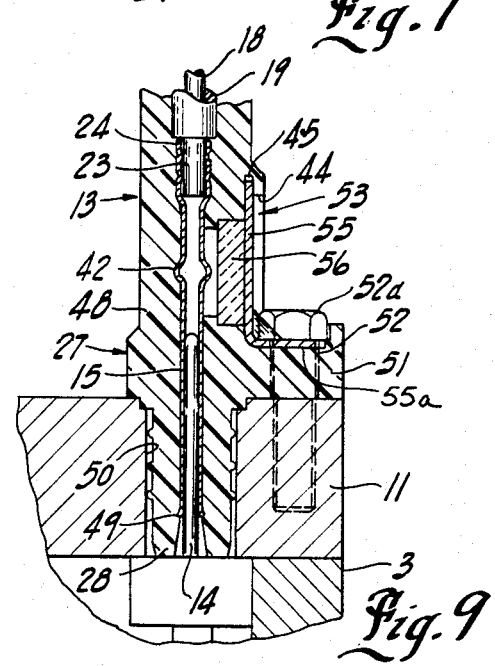

POWER CONNECTION APPARATUS HAVING INTEGRATED SURGE ARRESTOR

BACKGROUND OF THE INVENTION

The present invention relates to a power connector apparatus having an integrated surge arrestor means and particularly adapted for connection of the power cable to a submersible motor and the like.

Electrical power circuits may be subject to transient high voltage surges which can seriously damage the system components. Electric motors and particularly submersible well motors may be subject to high voltage surges if lightening strikes the supply system, for example. Submersible motors are used in combination with an integrated pump unit for pumping of water and other liquids from within a confining well or supply. Deep water wells include a drilled ground opening within which a well casing is secured. A submersible motor-pump unit consisting of a lower motor and an upper pump of a size is adapted to be dropped into the well, with a discharge pipe extending upwardly and providing a support structure. Generally the motor-pump unit is an elongated cylindrical assembly having an external diameter somewhat less than that of the well casing. A power cable lower end is connected to the motor and the cable is secured to the well support piping and extends upwardly out of the well to a suitable power supply. For domestic water applications, wells on the order of three hundred feet are not unusual. For commercial and institutional installations, the well may be much deeper.

The submersible motor is thus located within the lower end of the well and is not conveniently available for repair and servicing. Although submersible motor-pump units have a long operating life, generally substantially in excess of ten years, the motors operate in an adverse environment and are subject to various damaging events. The motor is rated for a maximum operating voltage and any abnormally high voltage, even of a relatively short period of time may damage and/or completely destroy a submersible motor. For example, if a lightening strikes the power supply and travels down through the cable to the motor, the stator winding of the motor will almost surely be destroyed. Replacement and/or servicing is not only inconvenient but expensive. Submersible motors are therefore presently almost universally provided with a surge voltage spark gap or arrestor which will bypass any abnormally high voltage around the motor winding and directly to ground. Although various systems have been suggested, a spark gap assembly is coupled to the motor leads within the motor. In the presence of any abnormal voltage condition of a level sufficient to damage a properly operating motor, the voltage is sufficient to break down the air gap between the lead and the ground member and a spark discharge is created to bypass the high voltage transient to ground. An arrestor unit includes a sealed can having a semi-conductor element located in spaced opposed relation to a disc member connected to the motor connecting leads or terminals. The air gap is enclosed by the case which is mounted in and connected directly to the motor casing, which in turn of course is directly grounded through the well water. Once the air gap is broken, a low resistance path from the lead to the ground is established. The surge voltage and current is then diverted from the motor winding directly through the resistance path to the ground. Such units provide a satisfactory functional protection of the motor.

Submersible motors may be of either a two-wire or a three-wire power supply system. Thus, such submersible motors generally are single phase induction motors and generally include a separate starting phase winding with a switch means for selectively disconnecting of a start winding after the motor reaches operating speed.

For example, U.S. Pat Nos. 3,997,232 which issued Dec. 14, 1976 and 4,053,196 which issued on Oct. 11, 1977, discloses a gap arrestor system incorporated directly into a connection assembly within the submersible motor structure. The surge arrestor unit consists of a multiplicity of parts including a disc-like metal member having three equicircumferentially spaced openings. The metal member is mounted in a cavity within the motor stator, with one motor lead terminal passing through each of the openings and in spaced relation to the member to form spark gaps. The connector assembly is sealed such that the gaps are sealed and protected from any surrounding environment. If a surge voltage is encountered with the motor in its operating position, a spark breakdown occurs and provides a short circuit path directly to ground. Another well known gap arrestor unit which has been used includes a separate canned unit for each lead having a disc member coupled to the power terminal and housed within a conductive can. The unit is located within a potted motor stator compartment and grounded to the motor end cap as shown in U.S. Pat. No. 3,849,704 which issued Nov. 19, 1974. Such devices have a finite life and must be replaced after a number of breakovers. Thus, each spark over tends to distructively burn the electrodes. A similar unit has been suggested in which a relatively heavy disc of silicon carbide is supported in the can by a plastic support and serves as the one spaced electrode. Such separate arrestor structure for each lead is expensive and reduces the economic feasibility of the approach. As a result, the less expensive individual spark gap system has generally been used.

Incorporation within the motor assembly in accordance with standard practice, particularly as a part of a multiple motor part connection assembly, is not particularly adapted to convenient low cost assembly, service and the like. Further, the limited available space for a releasable connector to the top of the motor has resulted in extended leads from the motor. The continuous leads from within the motor are spliced to a flexible cable. However in an oil filled motor, the stranded wires tend to act as a wick tending to draw the oil from the motor, which can be eliminated by the use of a sealed connector means. As noted, the surge arrestors have a finite life and may require replacement. With the surge arrestor incorporated into the motor structure, it is also difficult to properly test the motor during manufacturing. Thus, it is desirable, for example, to subject the motor to a high voltage limit test. With the surge arrestor in place, it is difficult to provide the desired testing of the motor winding and insulation. The surge protective system is advantageously constructed so as to provide universal application both to two-wire and three-wire motors.

SUMMARY OF THE INVENTION

The present invention is particularly directed to an improved surge arrestor unit for connection in circuit with a power system and to a power cable having incorporated therein an improved surge arrestor unit sealed in and forming an integrated portion of the connector assembly, and particularly adapted for connection to a submersible motor or the like. Generally, in accordance with the present invention, the surge arrestor includes a common or single integrated semiconductor element of silicon carbide or other similar functioning element, such as a metal oxide varistor material, coupled to the several lines of the power supply conductors to provide a common ground connection which serves to conduct the fault current and limit the fault voltage. Because the present invention is particularly adapted to providing a power connection to a submersible motor, the present invention is described hereinafter in connection with such a motor for purposes of clarity of explanation of several features and aspects of this invention, including those particularly arising from the combination to a submersible motor. Generally, in accordance with the present invention as applied to providing power to a submersible motor, the cable is formed with a plurality of lead terminals located in a substantially common plane. A flat connector assembly is integrally integrated into the end of the power load end of the cable and preferably includes an integrated insulating connector shell of a substantially flat, rectangular construction. The connector assembly forms one part of a two part releasable power connector, the other part of which is coupled directly to the motor. The respective motor and cable connector parts are complementing members which preferably form a plug-in connector apparatus, and each include complementing releasable terminal elements, one for each of the required power connections to the motor. The surge arrestor is formed in the cable connector assembly and is specially constructed with a ground connection plate which is exposed externally to directly ground the arrestor through the well liquid or is connected to the motor ground and thereby ground the integrated surge arrestor means. The cable connector part in one separate grounded embodiment includes a bolt-type locking means for securing the power cable to the motor and simultaneously connecting the cable arrestor ground terminal to the motor frame. In a preferred embodiment, the connector part includes the integrated insulating shell within which three power terminals are arranged in coplanar relationship. The integrated surge unit of the present invention includes an integral side wall arrestor opening in the cable connector shell. The arrestor opening is constructed to expose the aligned portions of the two outer terminal connectors while maintaining an insulation cover over the center terminal connector. The arrestor unit includes a surge arrestor block secured to a support plate which is secured in liquid tight connection to the shell. The block is mounted abutting the center cover and in spaced, aligned relation to the exposed terminals within sealed chambers. The arrestor support plate may include an integral terminal leg projecting outwardly of the connector shell and located to cooperate with the cable locking means to simultaneously lock the cable connector to the motor and electrically connect the block to the motor frame.

The arrestor assembly can be similarly connected to either a two-wire or a three-wire motor cable. Thus where a two-wire cable is employed, the same connector assembly is molded to the cable. The one terminal, however, is left blank and may be molded shut.

The cable integrated surge arrestor provides a simple, reliable and convenient means of producing a standardized two-piece motor connector which can be directly applied to either a two-wire or a three-wire motor, with the surge arrestor arrangement essentially identically constructed within the cable connector. The assembly is particularly adapted to provide a flexible cable to potted and to liquid filled submersible motors. Thus oil-filled motor and the like use solid conductors to avoid the wicking effect associated with stranded leads. The common arrestor unit which includes a sealed common arrestor block and multi-terminal unit may of course be located within the submersible and coupled to the internal motor power leads and terminals. The system preferably permits access to the surge arrestor unit for service and maintenance.

In a particularly practical and preferred construction, the power cable is formed as a relatively flat cable having flexible power wires located in coplanar relationship and with a relatively thin insulating film or web connecting the adjacent insulated wires. A short portion of the lead wire projects from the insulator cover. Three elongated tubular terminals are crimped or otherwise firmly secured to the projecting lead wires. The terminals are preferably tubular sockets or receptacles adapted to telescope with complementing terminal pins to establish a good electrical connection between the cable and motor. The three tubular terminals are embedded within a molded plastic shell defining a rigid electrical plug having a centrally located mounting flange and an outer insert portion adapted to be inserted in a motor mounted socket. The insert portion includes an inner rigid shell and an outer resilient boot, such that upon assembly the connection is liquid tight. The outer end of the shell has appropriate openings aligned with the terminal or sockets to permit the telescoped interconnection of the terminal sockets with terminal pins forming a part of the motor connector part. The molded shell is formed with the mounting flange spaced from the outer end and in accordance with the motor socket opening. In the assembled relation, the locating flange abuts the motor to properly locate the connector. Immediately outwardly of the flange, the shell is formed with the side wall arrestor opening exposing the adjacent portions of the terminals. The exposure is such that insulation extends between the terminals and projects outwardly to form locating ledges in a common locating plane in outwardly spaced relation to the exposed terminals. A flat arrestor plate is secured within the arrestor opening and is sealed to the adjacent edges of the molded shell. The arrestor block is secured to the plate as by a conductive adhesive and is located in spaced relation to the outer terminals with the projecting insulating side ledge and the center ledge define appropriate arrestor spacing. Although the shell is a relatively rigid member, the shell may be heated to create a certain flexibility. The shell is preferably molded with edge recesses within the arrestor opening and defining outer lips with the arrestor plate edges located therein. The projecting and overlapping plate edges and shell are secured in fluid-tight relation as by use of suitable adhesive to form a sealed arrestor chamber.

The inventor has found that the arrestor system provides a highly effective and reliable ground connection with a sealed voltage surge arrestor which is particlarly adapted to multiple wire applications, such as a submersible motor application, and which may require either a two-wire cable or a three-wire cable.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a simplified view of a deep water well with a motor-pump unit in place;

FIG. 2 is an enlarged side elevational view of the upper end of the submersible motor shown in FIG. 1 with parts broken away and sectioned to more clearly illustrate supply cable connection to the submersible motor;

FIG. 3 is an elevational view of the cable connector part incorporating an integrated voltage arrestor in accordance with the teaching of the present invention;

FIG. 7 is a view of the cable connector with the arrestor unit removed;

FIG. 9 is a view similar to FIG. 4 illustrating another embodiment of the invention.

DESCRIPTION OF THE ILLUSTRATED EMBODIMENT

Figure 5:
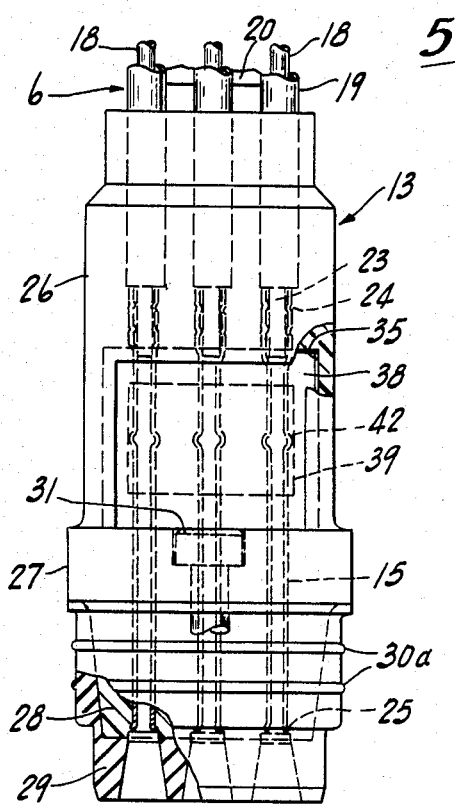
FIG. 5 is a front view taken generally on line 5—5 of FIG. 4 with the motor parts broken away.

Referring to the drawings and particularly to FIG. 1, a typical deep water well system is shown including a submersible motor-pump unit 1 supported within a drilled cased well opening 2. The well opening 2 extends downwardly to a couple of hundred feet and the submersible motor-pump unit 1 is located in the well below the water level 2a. The submersible motor-pump unit 1 includes a cylindrical electric motor 3 with a centrifugal pump unit 4 secured to the upper end thereof. A drop pipe 5 is secured to the top discharge end of the centrifugal pump unit 4 and extends upwardly through the cased well opening 2. The upper end of the pipe 5 is secured at the upper end of the well to support the unit 1 within the well. A power cable 6 extends from the upper end of the well casing downwardly through the well opening. The power cable 6 is generally strapped or otherwise secured to the pipe. The lower end of the power cable 6 is interconnected to the motor by a two-part releasable motor connector assembly 7 and provides appropriate power to the motor. The motor in FIG. 2 generally consists of an outer tubular metal shell 8 within which an annular stator unit 9 is secured. A rotor 10 is rotatably mounted within the tubular shell and within annular stator 9 by suitable bearing means, not shown. The upper end of the motor 3 is sealed with a bearing end cap 11 through which the motor shaft extends in sealed rotary sealed relation. The end cap 11 is generally a metal end cap and is bolted or otherwise firmly affixed to the tubular shell 8.

The two-piece connector unit 7 includes a motor part shown as connector recess or socket 12 formed within the end cap 11 and adapted to receive a cable connector plug 13 forming the cable connector part. The connector socket 12 is shown including three terminal pins 14 projecting upwardly within the socket 12. The terminals 14 are connected to three or more motor leads 14a within the stator 9 to provide power to the motor windings. The cable plug 13 is constructed with a corresponding plurality of socket or receptacles 15 adapted to mate with the pins 14. In accordance with the illustrated embodiment of the present invention, a voltage surge arrestor unit 16 is integrated into the cable connector part or plug 13 and coupled to each of the individual sockets 15 of the connector plug 13 to provide protection for each of the power lines. A lock connection 17 is provided between the end cap 11 and the cable plug 13 to seal the connector unit 7 in place.

The motor and pump structure may be any desired construction. As previously described both two and three wire submersible motors are of a well known construction. In addition, the inventor has developed a preferred motor which is particularly adapted to either a two-wire or three-wire motor circuit connection, which includes a three-wire terminal at the top of the motor to receive either a two-wire cable or a three-wire cable. Because the motor system may be of any desired construction and the present invention is particularly directed to the cable connector assembly 7 with the integrated surge voltage arrestor 16, no further description of the motor or pump components is set forth herein other than as necessary to clearly understand the present invention.

Figure 4:
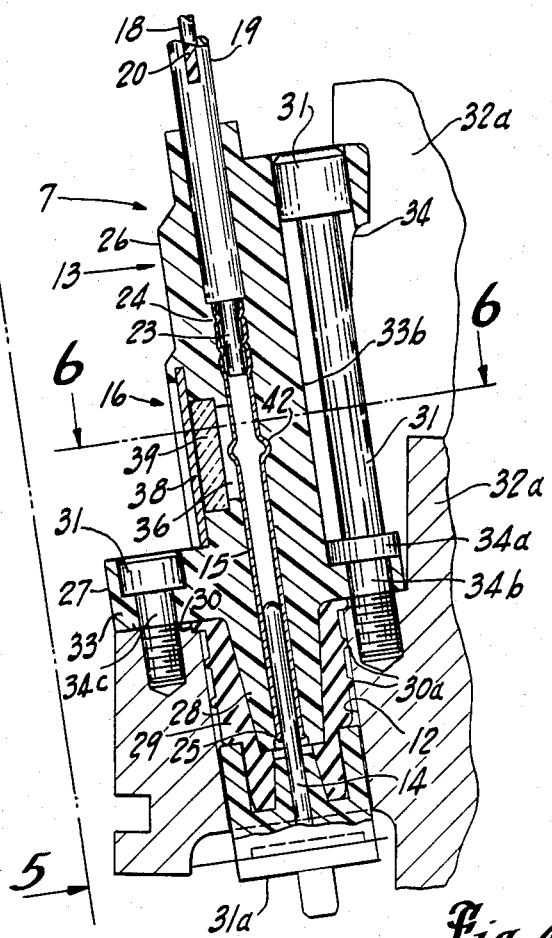
FIG. 4 is a longitudinal or vertical section through the motor connection assembly shown in FIGS. 1 and 2.

Referring to the drawings and particularly to FIGS. 3-5, the power cable 6 is shown as a flat three-wire rip-cord cable including three-power lines 18 having an insulating outer cover 19. The three-lines 18 are located in a common plane, with relatively thin connecting insulating webs 20 extending between the individual wire insulators 19. The thin flexible web 20 allows removal of the insulation at the ends and also permits flexing of the cable 6 from the principle plane. Thus the cable 6 can be placed abutting the pipe 5 for convenient and firm attachment of the cable to the supporting pipe.

The bare ends of the wires or lines 18 project outwardly slightly of the insulator cover 19, as at 23, and are secured to a socket 15. Each socket 15 is an elongated tubular member formed of a highly conductive material and of suitable wear resistance to allow appropriate releasable connection of the motor terminal pins 14 into the aligned sockets. The end of the elongated tubular socket 15 is secured to the projecting lead 23 in any suitable manner. The lead wire 23 are preferably standard flexible wires. Such wires, however, provide a wicking type action in the presence of any moisture which may enter the connection. To fully seal the connection, the lead wire 23 is preferably soldered into the socket 15 and then preferably crimped to the socket 15.

The outermost pin receiving end of the socket 15 is flared as at 25 for convenient entry of the pin 14 into the socket. The three sockets 15 are arranged in a common plane and in spaced relation to each other to provide suitable insulation therebetween. The sockets 15 are molded within a shell 26 to form a plug-in connector part.

The connector shell 26 is formed of a rigid plastic material to form an essentially self-supporting plug-in connector. For example, the shell 26 can be molded of a suitable block of polyvinylchloride (PVC). The shell 26 is formed as a flat, thin rectangular member having the terminals 15 in a common plane and in the principle plane of the shell. The connector shell 26 includes an integral projecting portion which projects onto and over the insulator 19 of the individual leads 18 to produce a firm physical interconnection as well as a liquid tight joint to the cable, thereby protecting the leads and terminals 15 from the surrounding well liquid. The connector shell 26 of course fills the space between the terminals and projects outwardly from the outermost flared socket ends 25 with flared end openings for convenient introduction of the terminal pins 14 into the plug sockets 15. The shell 26 is preferably formed as a rigid housing with a central annular flange or collar 27. The shell 26 is formed with an integral plug-in end insert 28 which is slightly smaller than the socket 12. An outer resilient boot 29 which seals to the socket 12 in the inserted position. The insert 28 is shown as a slightly tapered wall to the outer end. The boot 29 includes a flange 30 abutting the underside of the collar 27 and an inner opening complementing the tapered insert 28. The annular collar 27 abuts the outer wall of the motor end cap 11 to properly locate the plug 13 projecting into the end socket 12. The collar 27 includes a pair of spaced openings for receiving clamping bolts 31. The bolts thread into suitable tapped openings in the motor end cap 11 and securely lock the plug 13 in place with boot 29 sealing the connection liquid tight to provide power to the motor, as hereinafter described. The plug boot 29 includes a plurality of integral sealing rings 30a which engage the wall of the socket 12 as well as the pin support and provide the water tight connector connection.

The top motor end ring or cap 11 includes the corresponding complementing rectangular recess or socket 12. The terminal pins 14 are located within the socket 12 in coplanar relation and correspondingly arranged in accordance with the spacing arrangement of the tubular terminal sockets 15 of the cable plug 13. Thus, the terminal of pins 14 are supported in a suitable insulating support 31a secured within the lower end of the socket as by internal screws. As most clearly shown in FIG. 4, the support 31a is a recessed member to receive the innermost end of boot 29 and establish a double stepped seal between the end of the boot and the stepped portion of the boot.

The submersible motor is a cylindrical structure. The pump is a similar cylindrical structure connected to the upper end of the motor by an inlet coupler 32. Thus, the pump has a bottom inlet and the coupler has a plurality of circumferentially distributed inlet openings. The connector unit 7 is located to the top of the motor 3 within one of the inlet openings in coupler 32. The limited space does not provide a convenient area for provision of a reliable plug-in connection.

Figure 6:
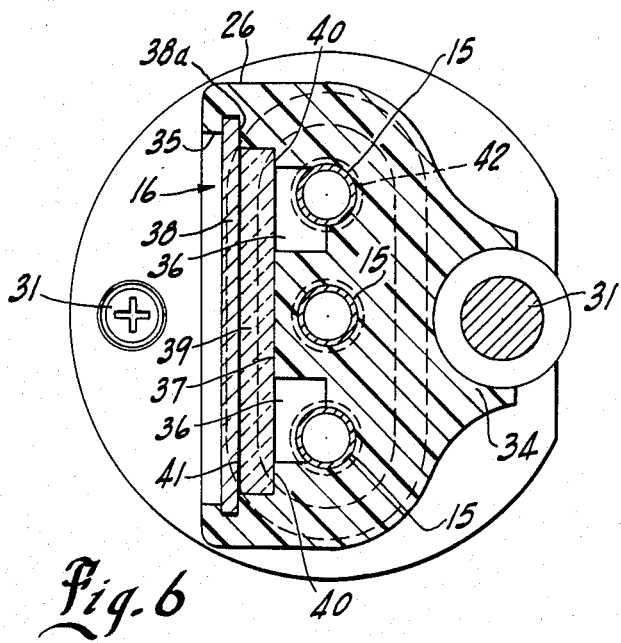
FIG. 6 is a transverse section taken generally on line 6—6 of FIG. 4.

In the illustrated embodiment, as shown most clearly in FIG. 4, the socket 12 is angled outwardly and the sealing surface or face 33 of the end ring 11 is also angled to maintain the perpendicular or normal relationship therebetween. The clamping face 33 and clamping collar 27 includes aligned clamp openings to the opposite sides of the collar 27 to receive the inner and outer bolts 31 as shown in FIG. 4. The bolts 31 are similarly formed with a Phillips head, as shown in FIG. 6, for receiving a corresponding Phillip screw driver. This minimizes the possibility of an inadvertent slipping of the tool during the rotation of a bolt and thereby minimizes possible damage to the plastic connection shell. The inner clamp bolt 31 is an elongated bolt and passes through an enlarged guide opening in an apertured boss 34 on the inner side of the plug-in housing or shell 26. The exterior side of the lower end of the boss 34 is removed to more fully accommodate the upper ring cast structure 32a adjacent the socket and provide room for the threaded opening to receive the long bolt 31. The elongated bolt 31 includes a clamping collar or washer 34a on the shank spaced outwardly of the bolt threads to define an unthreaded shank portion 34b which defines a stop shoulder at the beginning of the bolt threads. The washer 34a passes through the opening in the boss 34 and abuts the outer face of collar 27 to force collar 27 against the sealing face 33 of motor end cap 11 in the final clamp position of the elongated bolt 31. The head of the outer or front bolt 31 is recessed into collar 27 and spaced from the bolt threads to define an unthreaded shank portion 34c corresponding to the length of the shank portion 34b of the inner, long clamping bolt 31. The clamp washer 34a and front bolt head 31 in combination with the unthreaded shank portions 34b and 34c firmly clamp the connector to the motor without binding forces on the plug or overstressing of the collar 27 and thereby insure a long-life, liquid-tight connection to the motor. Thus, the unthreaded shanks 34b and 34c are accurately formed such that the junction at the threads define a stop which engages the end cap sealing surface 33 to limit the bolt clamping force on the collar 27.

The cable, formed of flexible leads, may be readily held against the pump by a suitable shield or the like, not shown, and then strapped to the discharge pipe for firm support within the well 2.

The voltage surge arrestor unit 16 of the present invention is secured to the cable connector shell 26 immediately outwardly of the clamping flange or collar 27. Generally the voltage surge arrestor unit 16, in the illustrated embodiment of the present invention, includes a side wall opening 35 defining a chamber located immediately outwardly of the locking flange or collar 37. The opening 35 extends inwardly in alignment with the two outer terminals partially beyond the plane of the terminals sockets 15 to define generally rectangular chambers within which the outer two of the terminal sockets 15 have a limited exposure, as at 36 and separated by an insulation wall or ledge 37 covering the center terminal 15, as shown most clearly in FIGS. 6 and 7.

An arrestor support and connector member 38 is secured to the connector shell 26 at the opening 35. The member 38 is a conductive plate located within the outer wall portion of the shell 26 abutting a ledge 38a in opening 35 and also projecting beneath a projecting lip about the opening to close the side wall opening 35 and define an exteriorly exposed wall of the sealed arrestor chambers about the exposed terminals 15. An arrestor block 39 is intimately affixed to the plate 38 and is located within the chamber opening 35 with its face abutting the insulation ledge and spaced from the top exposed terminal sockets 15. The ledge 37 is shown with a small opening 39a which results from the molding technique, but does effect the system operation as described herein.

The arrestor opening 35 is formed with an encircling edge ledge 40 located in the plane of the insulating center ledge 37 and thus outwardly of the exposed terminals 15 in accordance with the desired spacing of the sockets from the arrestor block 39.

The arrestor block 39 is a suitable semiconductor material adapted to conduct and dissipate the energy of the surge current and voltage. Silicon carbide material has produced exceptional and reliable operation over repeated surges. A metal oxide varistor material or other similar material may also be used.

The arrestor block 39 is preferably a thin, rectangular wafer of silicon carbide. The wafer 39 is intimately attached to the plate 38 as by a conductive adhesive 41 such as a silver epoxy. The wafer 39 is slightly shorter than the width of the plate 38, with the opposite end portions aligned with the outer terminal sockets 15. The silicon carbide material is a substantially porous material with individual particles defining conductive junctions for conducting of the surge currents to the plate and ground. The silicon carbide material is temperature sensitive and is operative to dissipate the surge energy as a result of the restrictive conducting path formed by the conducting junctions. The wafer 39 is a relatively thin member, such as about thirty thousandths of an inch. The thickness selected is generally limited by the limited available space and is such that the wafer has limited ability to absorb the energy in the surge. However, with the plate 38 exposed to the well water, the wafer 39 is connected in series with the water and provides a resistive series circuit which has been found to produce reliable conduction of the surge current. The system has been found to limit the follower current and prevent damage to the protective system. The silicon carbide material has the ability to withstand repeated arcing between the terminal and the block, and thus provides a long, reliable arrestor device.

Although silicon carbide, when used in arcing environments, is generally provided with conductive coating to spread the current surge over the energy dissipating block, the inventor has found the carbide wafer is preferably provided uncoated as illustrated. This prevents the current from traveling along the surface to the other terminal rather than to ground. A conductive coating may thus create a path between the outer terminals sockets 15, with the transient voltage shorted across the terminals rather than to ground. In the presence of a voltage surge, the gases within a sealed chamber ionizes and, in the absence of wall 37, the arc may move sideways and spark over to the adjacent terminal. In the 230 volt system, the two outside terminals 15 are the hot sides of the 230 volt supply and the central lead is connected to the capacitor branch circuit. The central lead or terminal 15 is thus self-protecting. The central insulating ledge 37 isolates the two "hot" terminal sockets 15 from each other and the center terminal sockets 15, and substantially increases the length between the outer "hot" terminals 15 so as to essentially avoid spark over between the terminals.

Thus, the illustrated embodiment of the invention has been tested and found to provide reliable response to repeated abnormal surge voltages in excess of industry standard.

The arrestor block 39 extends through the opening and rests on the side edges 40 and the central ledge 37. In the illustrated embodiment of the invention, the sockets terminals 15 are formed with annular struck-out or deformed enlargements 42 which project outwardly within the chambers. The enlargements 42 of the sockets terminals 15 have a depth less than that of ledges to maintain a predetermined arrestor gap between the terminals and the opposed face of the arrestor block 39. The enlargement provides a concentrated high voltage point of current conduction and maintain reliable, repeatable discharge whenever an abnormal transient voltage is created.

In operation, an abnormal high voltage at either outer terminal 15 ionizes the gas within the chamber and conducts current from the terminal enlargement or projection which provides a point-type or concentrated conduction to the silicon carbide block for more reliable and repeatable operation in response to successive high voltage conditions. The voltage rise generally exists for microseconds only and the current distributes through the block to the mounting plate and then directly to the water. Although water is a relatively good conductor, the resistance is sufficient to assist the wafer and contribute to the ability of the system to absorb the substantial energy in the transient voltage and current.

Figure 8:
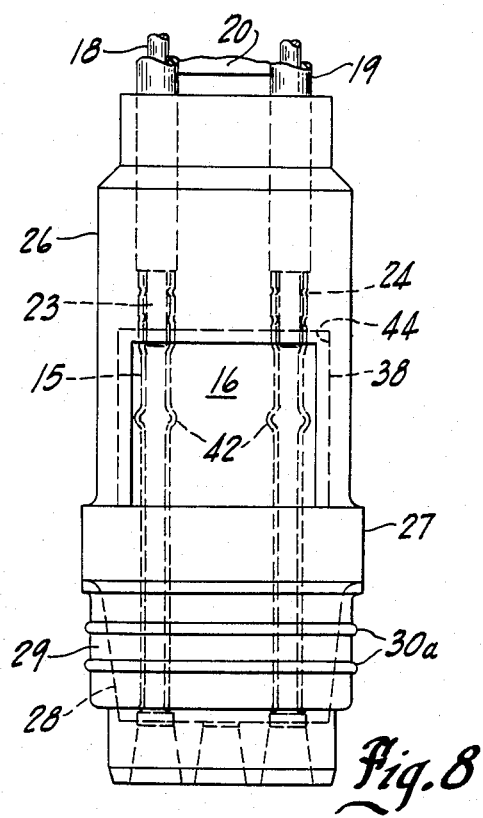
FIG. 8 is a view similar to FIG. 2 illustrating a connector for a two-wire motor cable connector assembly.

The embodiment is particularly shown applied to a three cable. In a two-wire system, the same end pig-tail connector would be used, with the central terminal left blank, as shown for example in FIG. 8. Thus, in a two-wire cable, the start capacitor unit is separately connected in circuit to the motor unit, which may include a separable capacitor unit, such as by releasably coupled capacitor and switch unit connected within the motor or as a separate attachment thereto.

The arrestor block 39 is secured to the closure support plate 38 as by an interface adhesive bond 41. The molded shell 26 is formed with edge recesses in the plane of the chambers and in the outer portion of the chamber opening to define three side edge lips 44 covering the end and sides of plate 38. The plate 38 is located with its peripherial edges projecting inwardly of the shell behind the lips 44. Sealant 45 is interposed between the projecting edge of the plate 38 and the recesses including the lips 44 to produce a liquid tight connection of the plate 38 to the shell. This provides a water tight sealing of chambers 34 and 35 and defines a controlled voltage air gap 42a between the several terminal receptacles and the plate.

An alternate embodiment is shown in FIG. 9 applied to a submersible motor. Corresponding elements in the two embodiments are given same number for simplicity and clarity of explanation. In the second embodiment the connector shell 48 is shown as a single piece member semi-rigid plastic material to form an essentially self-supporting plug-in connector. For example, the shell 48 can be molded of a suitable block copolymer plastic manufactured and sold by Shell Oil Company under Shell Chemical Company under the trademark Kraton. The shell is formed as a flat, thin rectangular member having the terminals 15 in a common plane and in the principle plane of the shell 48. The connector shell 48 of course fills the space between the terminals 15 and projects outwardly from the outermost flared ends of the terminals. Slightly flared openings 49 extend outwardly, one each in alignment with each of the terminal sockets 15 for convenient introduction of the terminal pins 14 into the plug sockets 15.

The top motor end cap 11 includes the corresponding complementing rectangular recess or socket 50 with the terminal pins 14 correspondingly arranged to mate with the tubular terminal sockets 15 of the cable plug 13.

In addition, the connector shell 48 is formed with a mounting flange 51 which abuts the outer wall of the motor end cap 11 to properly locate the plug 13 projecting into the end socket 12.

The collar or flange 51 extends outwardly from one principle plane or side of the connector shell beyond the edges of the shell and includes end openings 52 which receive clamping bolts 52a. The bolts 52a thread into suitable tapped openings in the motor end cap 11 and securely lock the plug in the sealed and connected position to provide power to the motor.

The voltage surge unit 53 of the present invention is secured to the cable connector shell 48 immediately outwardly of the clamping flange 32, generally as in the previous embodiment. The arrestor unit 53 is again located immediately outwardly of the flange 51 and extends inwardly partially beyond the plane of the terminals sockets 15. The outer plate member of the arrestor unit 53 is an L-shaped support and connector member having a first plate 55 located within the outer wall portion of the shell 48 and closing the side wall opening to define the outer wall of a sealed arrestor chamber. An arrestor block 56 is intimately affixed to the plate 55. A second plate 55a shown integrally connected to the plate 55 extends perpendicularly from the principle plane of the plate 55 and connector plug 12. Plate 55a, is located abutting the outer face of the clamping flange 51. Ground/connector bolts 52a pass through appropriate aligned openings 57 in the plate 55a and the clamping flange 51 and thread into the correspondingly threaded openings in the motor end cap 11. The bolts 52a provide firm physical connection of the plug 13 to the motor in releasably fixed sealed relation, The bolts 52a simultaneously provide electrical connection between the L-shaped plate member 55 and thus arrestor block 56 and the grounded motor housing 8.

The illustrated cable arrestor assembly is particularly desirable in permitting convenient servicing or replacement of the arrestor if required. Further, the cable arrestor also permits factory testing of the motor. Thus, the motor can be tested without the surge arrestor in circuit, and the necessary test voltages impressed on the windings.

The illustrated embodiments have been found to provide a particularly effectively long life arrestor unit which is readily constructed as an integrated part of a cable connector for use in a submersible motor or the like.

Various modes of carrying out the invention are contemplated as being within the scope of the following claims, particularly pointing out and distinctly claiming the subject matter which is regarded as the invention.

I claim:

1. A power line unit having a least two power leads, an insulating shell encasing said power leads, said shell including a sidewall arrestor opening exposing said power leads, an arrestor unit secured within said opening to form an exterior exposed wall and secured to the edges of said opening to close said opening and including an arrestor block within said opening in opposed operative relation to said exposed leads, and said arrestor unit having a ground connection secured to said arrestor block.

2. The power line unit of claim 1 including at least three power leads in a substantially common plane and having the two outer leads constituting said two exposed leads and being separated by an insulation ledge encasing the central lead.

3. A power line unit including at least three power leads in a substantially common plane, an insulating shell encasing said power leads, said shell including a sidewall arrestor opening exposing the two outer leads constituting said two exposed leads and being separated by an insulation ledge encasing the central lead, an arrestor unit including a mounting plate secured to the outer portion of said shell and closing said opening, an arrestor block secured to said plate and projecting into said opening into abutting engagement with said insulation ledge to separate the chambers surrounding said exposed leads, and means sealing said plate to said shell to form a liquid tight arrestor chamber.

4. The power line unit of claim 1 wherein said arrestor unit includes a metal conducting plate secured within said opening and defining the exterior exposed wall and constituting said ground connection, said arrestor block being affixed to said plate.

5. The power line unit of claim 1 wherein said arrestor unit includes a mounting plate secured to the outer portion of said shell and said arrestor block being formed of silicon carbide, an electrically conductive adhesive connecting said arrestor block to said plate and projecting into said opening, means sealing said plate to said shell to form a liquid tight arrestor chamber.

6. The power line unit of claim 4 wherein said insulating shell includes insulating ledges projecting outwardly of the exposed leads within said arrestor opening to a common plane with said insulating ledges for locating said arrestor block and defining an arrestor spacing between said block and a plurality of terminals and means securing said plate to said shell with said arrestor block engaging said ledges.

7. The power line unit of claim 4 wherein said insulating shell includes insulating ledges projecting outwardly of the power leads within said arrestor opening to a common plane for locating said arrestor block and defining an arrestor spacing between said block and a plurality of terminals, said projecting ledges includes a first encircling ledge about the periphery of said arrestor opening and a projecting ledge between adjacent power leads, said arrestor block including a planar face abutting said ledges, and means securing said plate to said shell with said arrestor block engaging said ledges.

8. The power line unit of claim 4 having a connection flange connected to said plate and extending outwardly of said plate, and locking means coupled to said shell and to said flange to support the line unit and ground said flange.

9. A power cable having an end connector part forming one half of a two-part releasable plug-in connector, wherein said end connector includes a cable end having at least two power leads including an outer insulation encasing the conductive wires, comprising elongated plug-in terminals affixed to said wires one each to each of said leads and extending longitudinally of said leads, a flat insulator shell encasing said terminals and at least the terminal portion of said outer insulation, said shell having a width adapted to encase at least three of said terminals and a thickness substantially less than said width, said shell having a sidewall opening exposing only the corresponding side surfaces of selected ones of said terminals, said opening including stepped side edges defining a projecting wall means between said exposed terminals and having outer edges coplanar with said wall means, a closure plate sealed within said opening and including a surge arrestor block abutting said wall means and edges to define a surge chamber about each of said exposed terminals with the inner face of said block in opposed spaced from said exposed terminals, and means sealing the closure plate to said shell to form a watertight surge chamber about each of said exposed terminals.

10. The power cable of claim 9 including a ground connector flange connected to said closure plate and projecting outward therefrom, a mounting flange connected to said shell and projecting outwardly adjacent said connector flange, said flanges having a plurality of aligned openings to receive clamping bolt means.

11. The power cable of claim 10 wherein said connector flange is integral with the closure plate.

12. The power cable of claim 9 wherein said shell includes a mounting flange adjacent said closure plate and a plug-in insert portion extending from said flange for mating with the opposite half of the connector, said insert portion having a tapered configuration, and a resilient boot telescoped over said tapered plug insert portion.

13. The power cable of claim 12 wherein said mounting flange is integral with said shell.

* * * * *